United States Patent
Lee et al.

(10) Patent No.: US 12,134,552 B2
(45) Date of Patent: *Nov. 5, 2024

(54) LIQUID DISPENSER

(71) Applicant: LG ELECTRONICS INC., Seoul (KR)

(72) Inventors: Jaehoon Lee, Seoul (KR); Kyuchun Choi, Seoul (KR); Dong Seong Kim, Seoul (KR); Hyung Kook Joo, Seoul (KR); Daewoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,243

(22) Filed: Sep. 5, 2023

(65) Prior Publication Data

US 2023/0406687 A1    Dec. 21, 2023

Related U.S. Application Data

(63) Continuation of application No. 17/557,439, filed on Dec. 21, 2021, now Pat. No. 11,780,721.

(30) Foreign Application Priority Data

Jan. 8, 2021    (KR) .................. 10-2021-0002347

(51) Int. Cl.
*B67D 1/08*    (2006.01)
*B67D 1/00*    (2006.01)
(Continued)

(52) U.S. Cl.
CPC ......... *B67D 1/0888* (2013.01); *B67D 1/0014* (2013.01); *G05D 3/12* (2013.01); *B67D 2210/0001* (2013.01); *G01S 13/08* (2013.01)

(58) Field of Classification Search
CPC .............. B67D 1/0888; B67D 1/0014; B67D 2210/0001; B67D 1/0878; B67D 1/0085;
(Continued)

(56) References Cited

U.S. PATENT DOCUMENTS 5,687,609 A    11/1997  Schmalzel
9,352,950 B2   5/2016   Berger
(Continued)

FOREIGN PATENT DOCUMENTS

KR    10-1227450    1/2013
KR    10-2018-0029665    3/2018
(Continued)

OTHER PUBLICATIONS

Korean Office Action dated Aug. 28, 2022 issued in Application No. 10-2021-0002347.
(Continued)

*Primary Examiner* — Donnell A Long
(74) *Attorney, Agent, or Firm* — KED & ASSOCIATES, LLP

(57) ABSTRACT

In a water purifier or other liquid dispenser, a sensor configured to transmit and receive a distance measuring signal is installed in a water discharge module moving vertically or disposed at the front of a main body, to sense a height of the inlet of a container accurately without a no-response duration of the sensor. Additionally, in the water purifier, the water discharge module discharges purified water at a point spaced a certain distance apart from the inlet of the container, to prevent the inlet of the container from contacting the lower surface of the water discharge module.

20 Claims, 9 Drawing Sheets

(51) Int. Cl.
*G05D 3/12* (2006.01)
*G01S 13/08* (2006.01)

(58) Field of Classification Search
CPC ........ B67D 1/1238; G05D 3/12; G01S 13/08; G01S 13/88; G01F 23/284
See application file for complete search history.

(56) References Cited

U.S. PATENT DOCUMENTS

| | | |
|---|---|---|
| 11,447,383 B2 * | 9/2022 | Jang ..................... B01D 35/30 |
| 2008/0264092 A1 | 10/2008 | Chase et al. |
| 2012/0138629 A1 | 6/2012 | Ashrafzadeh |
| 2013/0000337 A1 | 1/2013 | Krause et al. |
| 2016/0068383 A1 | 3/2016 | Falco, III |

FOREIGN PATENT DOCUMENTS

| | | |
|---|---|---|
| KR | 10-2018-0109259 | 10/2018 |
| KR | 10-1927673 | 12/2018 |
| KR | 10-2146850 | 8/2020 |
| KR | 10-2020-0129919 | 11/2020 |
| KR | 10-2020-0131715 | 11/2020 |

OTHER PUBLICATIONS

Korean Office Action dated Jun. 28, 2023 issued in Application No. 10-2021-0002347.

* cited by examiner

LIQUID DISPENSER

CROSS-REFERENCE TO RELATED APPLICATION(S)

This application a Continuation Applications of prior U.S. patent application Ser. No. 17/557,439, filed on Dec. 21, 2021, which claims priority under 35 U.S.C. § 119 to Korean Patent Application No. 10-2021-0002347 filed on Jan. 8, 2021, whose entire disclosures are hereby incorporated by reference.

BACKGROUND

1. Field

Disclosed herein is a liquid dispenser, such as a water purifier, that senses a height of the inlet of a container and discharges filtered raw water to the container.

2. Background

Water purifiers are devices that purify water with a filter. A water purifier can be an independent device or a device disposed on the front surface of a refrigerator or other appliance. The water purifier discharges filtered raw water, i.e., purified water, to a container placed below a water discharge module. In this case, due to a difference between a height of the bottom surface of the container and a height of the water discharge module, the purified water can splash from the container, causing inconvenience to a user.

To prevent this from happening, water purifiers having a water discharge module capable of moving vertically have been developed. In a water purifier of the related art, a water discharge module moves to a point near the rim of a container, and at the point, a water discharge nozzle installed in the water discharge module discharges the purified water. To implement the operation of the water purifier of the related art, it is important to measure a height of the rim of a container accurately. In relation to this, various technologies for measuring a height of the rim of a container have been suggested.

According to a first type of related art, a contact sensor (i.e., a bumper or a switch) is disposed on the lower surface of a water discharge module, and as the contact sensor contacts the rim of a container, a height of the rim of the container is measured. However, according to the first related art, proper hygiene cannot be ensured.

FIG. 1 shows the structure of the water purifier according to a second type of related art. FIG. 1 is excerpted from FIGS. 4 and 5 in Korean Patent Publication No. 10-2018-0109259, and the reference numerals in FIG. 1 are given only to the components in FIG. 1.

Referring to FIG. 1, the water purifier according to this related art includes a wide-angle ultrasonic sensor 17 and a narrow-angle ultrasonic sensor 18 provided near a nozzle 121 in a dispenser 12, and the wide-angle ultrasonic sensor 17 transmits and receives a Time of Flight (ToF) signal to measure the height of the container. That is, the wide angle ultrasonic sensor 17 includes a transmitter 171 and a receiver 172 on a printed circuit board 173, and ultrasonic waves received from the transmitter 171 are reflected by the container 1 and are received by the receiver 172, and based on the intensity of the received ultrasonic waves, a height of a container is measured. However, according to this related art, a height of the rim of a container having a thin inlet, i.e., a thin rim, cannot be measured accurately.

SUMMARY

One aspect of the present disclosure is to provide a liquid dispenser that measures a height of the inlet of a container accurately and discharges purified water into the container. Another aspect of the present disclosure is to provide a liquid dispenser that measures a height of the inlet of a container without causing hygiene problems. Another aspect of the present disclosure is to provide a liquid dispenser that measures a height of the inlet of a container accurately even if the rim of the inlet of the container is narrow. Yet another aspect of the present disclosure is to provide a liquid dispenser that protects a sensor for measuring a distance from foreign substances. Aspects according to the present disclosure are not limited to the above ones, and other aspects that are not mentioned above can be clearly understood from the following description and can be more clearly understood from the embodiments set forth herein.

In a liquid dispenser of one embodiment, a sensor that transmits and receives a distance measuring signal is installed in a liquid discharge module moving vertically, or disposed at the front of a main body, to measure a height of a container accurately without a no-response duration of the sensor. In the liquid dispenser of one embodiment, a liquid discharge module discharges purified water at a point spaced a certain distance apart from the inlet of a container, to prevent the inlet of the container from contacting the lower surface of the liquid discharge module.

A liquid dispenser in one embodiment may include, a main body, a liquid discharge module including a nozzle at a lower surface thereof to discharge a liquid, and configured to move the nozzle vertically along a front of the main body, and a sensor provided inside one of the main body or the liquid discharge module, and configured to transmit a signal to the container and to receive a reflected signal from the container. Here, the signal passes through the one of the main body of the liquid discharge module, and the sensor is positioned to be spaced a predetermined distance apart from a corresponding one of a front of the main body or a lower surface of the liquid discharge module.

A liquid dispenser in other embodiment may include, a main body to provide a liquid, a liquid discharge module including a nozzle to discharge the liquid to a container and to vertically move along a front of the main body, a connector arm including a first end connected to the liquid discharge module so the connector arm moves vertically along with the nozzle of the liquid discharge module, and a sensor provided at a second end of the connector arm, and configured to transmit a signal and to receive a reflection of the signal. Here, a height of an inlet of the container is determined based on the reflected signal.

According to the present disclosure, purified water or other liquid is discharged at a point spaced a certain distance apart from the inlet of a container, thereby preventing the purified water form splashing from the container outward. According to the present disclosure, the inlet of a container does not contact the lower surface of a liquid discharge module, thereby solving hygiene problems. According to the present disclosure, a sensor for measuring a distance is installed in a liquid dispenser, thereby protecting the sensor from foreign substances. Other specific aspects are described along with the above-described aspects in the Detailed Description.

BRIEF DESCRIPTION OF THE DRAWINGS

The embodiments will be described in detail with reference to the following drawings in which like reference numerals refer to like elements wherein.

DETAILED DESCRIPTION

Figure 1:
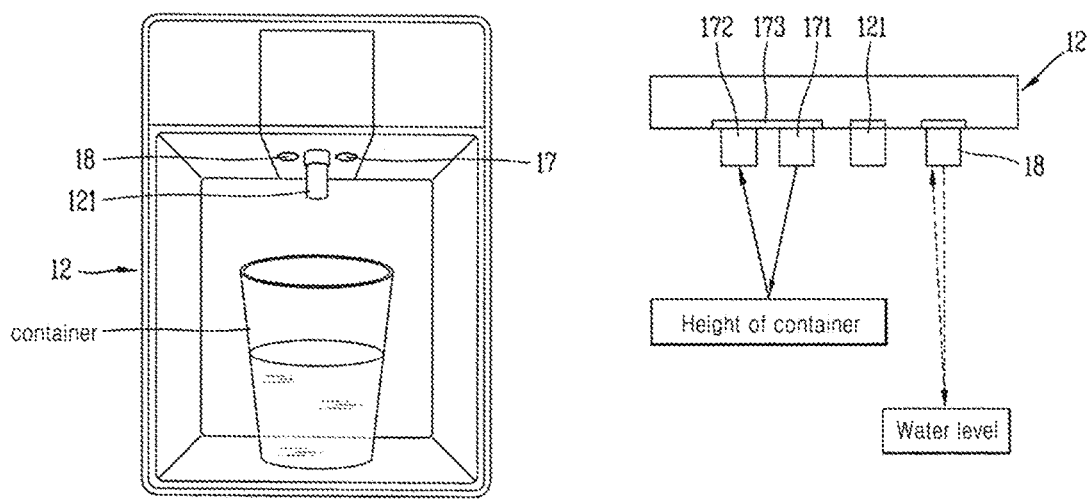
FIG. 1 is a view for describing a water purifier from a related art.
Figure 2:
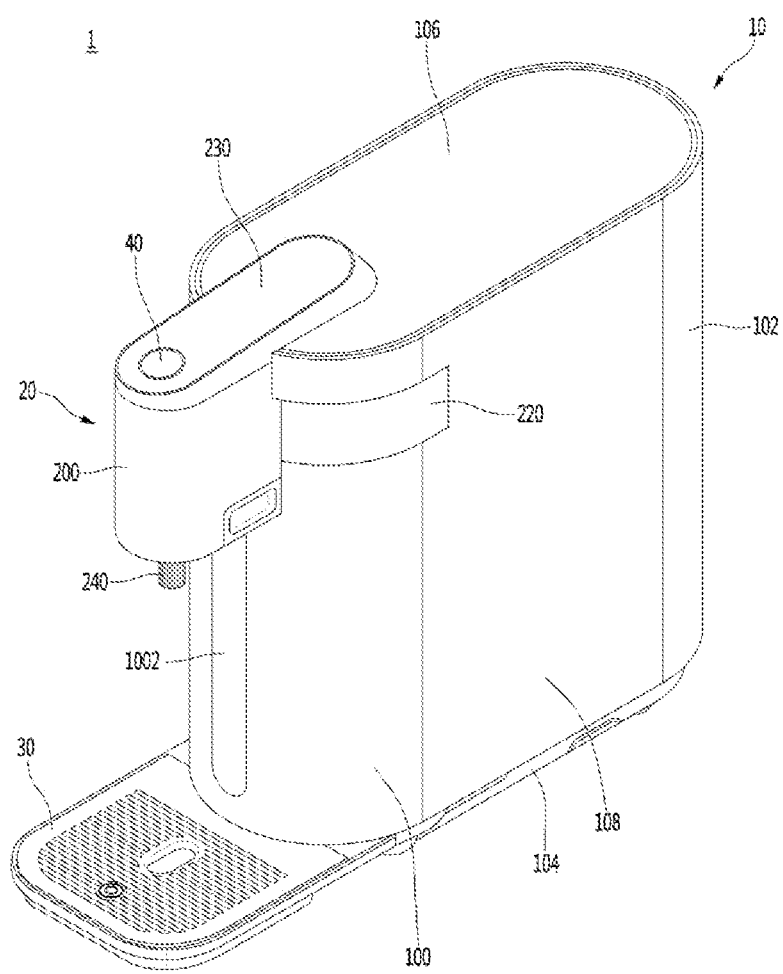
FIG. 2 is a perspective view showing a water purifier in one embodiment.

Hereafter, liquid dispensers, such as water purifiers, in several embodiments are described. FIG. 2 is a perspective view showing a water purifier (or liquid dispenser) 1 in one embodiment. Referring to FIG. 2, the water purifier 1 in one embodiment may include a main body 10 and a water discharge module (or liquid discharge nozzle) 20.

The main body 10 is a main component of the water purifier 1 that dispenses a liquid. In certain examples, the water purifier 1 produces purified water, hot water and cool water by filtering raw water. The main body 10 may include a main body case that forms the exterior of the water purifier 1, and various types of components that filter raw water. The main body case may have a space therein, and various types of components that filter raw water are installed in the inner space.

The main body case may be formed in a way that a plurality of covers 100, 102, 104, 106, 108 are coupled. Specifically, the main body case may include a front cover 100, a rear cover 102, a base cover 104, a top cover 106 and a pair of side covers 108. The covers 100, 102, 104, 106, 108 constituting the main body case may form the exteriors of the front surface, the rear surface, the bottom surface, the upper surface and both the lateral surfaces of the main body 10.

The covers 100, 102, 104, 106, 108 constituting the main body case may be coupled to one another using a coupling member or a coupling structure. Specifically, the front cover 100 and the rear cover 102 may be spaced from each other in a front-rear direction. The pair of side covers 108 may respectively connect to the front cover 100 and the rear cover 102. The top cover 106 may be coupled to the upper ends of the front cover 100, the rear cover 102, and the pair of side covers 108. The base cover 104 may be coupled to the lower ends of the front cover 100, the rear cover 102, and the pair of side covers 108. The base cover 104 may be a cover that is mounted onto a floor surface on which the water purifier 1 is disposed.

The front cover 100 and the rear cover 102 may be formed in a way that the front cover 100 and the rear cover 102 are bent at a predetermined curvature, and the pair of side covers 108 may be formed into a flat plate. The base cover 104 and the top cover 106 may have a front end and a rear end that are rounded, to correspond to the front cover 100 and the rear cover 102.

A flat surface part (or flat front cover surface) 1002 may be formed in the central portion of the front cover 100 in an up-down direction. The flat surface part 1002 may be a dent portion of the front cover 100 that convexly protrudes forward. The flat surface part 1002 may serve as a center point at a time of the rotation of the water discharge module 20 described hereunder. A container such as a cup and the like for collecting water may be disposed in front of the front cover 100. The container may be placed more reliably with the formed flat surface part 1002.

The water purifier 1 may further include a tray 30 onto which the container is mounted. The tray 30 may connect to the base cover 104 and protrude forward. Together with the base cover 104, the tray 30 may form the lower surface of the water purifier 1. The tray 30 may be disposed perpendicularly below a water discharge nozzle 240 described hereunder. The tray 30 may be formed as a structure for storing water that falls down without being accommodated in the container.

The water discharge module 20 may be coupled to and protrude from one side of the main body 10. Specifically, the water discharge module 20 may be disposed to protrude forward from the front cover 100 and the top cover 106. The water discharge module 20 may be coupled to and communicate with the main body 10. At least a portion of the water discharge module 20 may move vertically, and discharge purified water, hot water and cool water to the container.

The water discharge module 20 may include a water discharge module case forming the exterior of the water discharge module 20. The water discharge module case may include a water discharge top cover (or liquid discharge module top cover) 230, a water discharge lifting cover (or liquid discharge module lifting cover) 200, 210 and a water discharge side cover (or liquid discharge module side cover) 220.

The water discharge side cover 220 may be a cover that is mounted onto the main body 10. The water discharge side cover 220 may be disposed in a way that the front cover 100 is divided into an upper portion and a lower portion. Accordingly, the front cover 100 may be divided into a lower front cover coupled to the base cover 104, and an upper front cover coupled to the top cover 106.

The water discharge lifting cover 200, 210 may be disposed to protrude from the front cover 100 forward. The water discharge lifting cover 200, 210 may be disposed to convexly protrude from the water discharge side cover 220 outward.

The water discharge top cover 230 may extend from the top cover 106 and be disposed to cover the upper end of the water discharge lifting cover 200, 210. An input part (or button) 40 for allowing a user to input an instruction for a predetermined operation may be disposed on the water discharge top cover 230. The input part 40 may be implemented as a variety of forms such as a button-type input part, a touch-type input part and the like.

The water discharge module 20 may include a water discharge nozzle (also referred to herein as a liquid discharge nozzle or nozzle) 240 that discharges any type of liquid, such as purified water, cool water and hot water. The water discharge nozzle 240 may be installed in a way that the water discharge nozzle 240 is exposed to the lower surface of the water discharge module 20. The tray 30 may be disposed below the water discharge nozzle 240 perpendicularly.

A water discharge pipe, or liquid discharge pipe, (not illustrated) connected to the water discharge nozzle 240 may be disposed inside the water discharge module 20. The water discharge pipe may extend to the inside of the water discharge module 20, in the main body 10, and be coupled to the water discharge nozzle 240.

Figure 3:
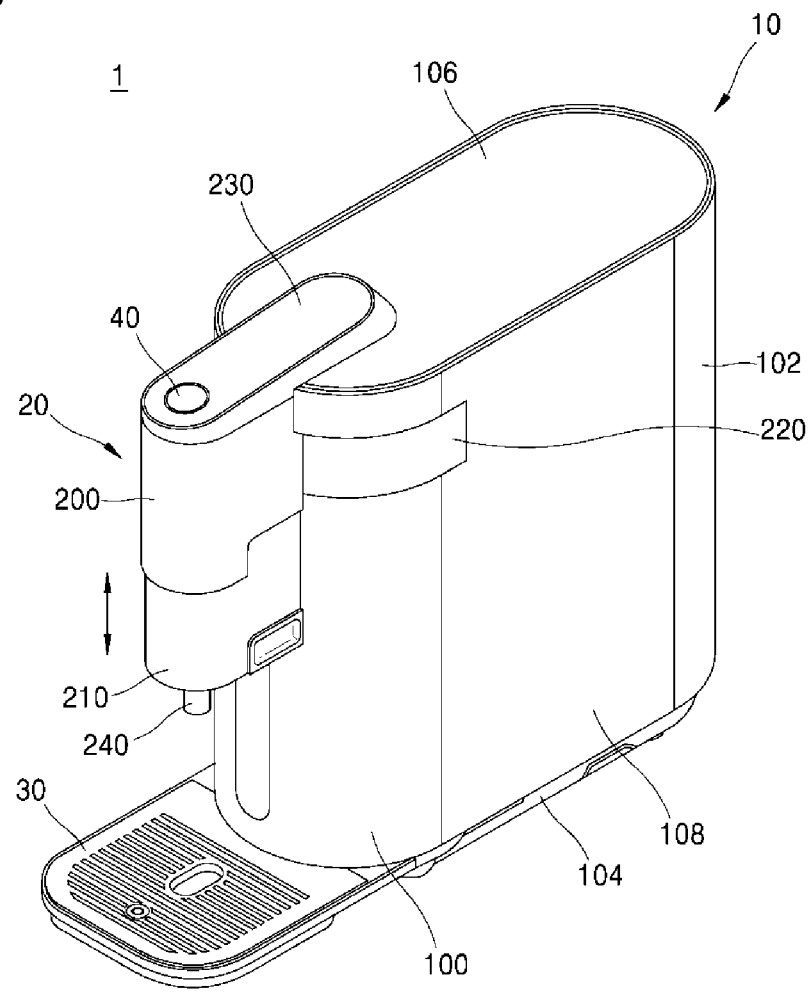
FIG. 3 is a perspective view showing a water purifier in which a position of a water discharge nozzle changes, in one embodiment.

In one embodiment, the water discharge module 20 may move such that a position of the water discharge nozzle 240 changes. Referring to FIG. 3, the water discharge module 20 may move vertically. That is, the nozzle 240 of the water discharge module 20 may move up and down.

The vertical movement of the water discharge module 20 is described as follows. The water discharge lifting cover 200, 220 includes a first lifting cover (or first front cover) 200 and a second lifting cover (or second front cover) 210. The first lifting cover 200 may be fixed to the water discharge side cover 220. That is, the first lifting cover 200 does not move vertically. The water discharge top cover 230 may be coupled to the upper end of the first lifting cover 200. The second lifting cover 210 may be disposed inside the lifting cover 200 and move vertically along the first lifting cover 200. The water discharge nozzle 240 may be disposed on the lower surface of the second lifting cover 210 and move vertically along with the second lifting cover 210.

Additionally, the water discharge module 20 may lift automatically, and the automatic lift of the water discharge module 20 may be performed by a controller (not illustrated) disposed in the main body 10. The controller may be a processor-based device, and for example, may be a microcomputer (micom). Herein, the processor may include one or more of a central processing unit (CPU), an application processor, or a communication processor. The controller (not illustrated) controls a compressor, a cooling fan, various types of valves, a sensor, an induction heating assembly, and the like that are disposed in the main body 10, and, in particular, the vertical movement of the water discharge module 20.

The water purifier 1 includes a distance measuring sensor for measuring a height of the inlet of a container (i.e., a height of a rim) and/or a height (i.e., a water level) of a liquid, such as the purified water, cool water, hot water and the like (hereafter, "water") that are accommodated in the container. FIGS. 4 to 9 show a distance measuring sensor (or sensor) 300.

The distance measuring sensor 300 transmits and receives a distance measuring signal. The distance measuring sensor 300 has a structure in which a transmitter and a receiver are integrated. The transmitter transmits a distance measuring signal. The transmitted distance measuring signal reflects off the container and/or the water accommodated in the container, and the reflected distance measuring signal is received by the receiver.

The receiver may transmit a receipt time point of the received distance measuring signal to the controller, and further transmit a receipt angle of the received distance measuring signal to the controller. The controller may measure a height of the inlet of the container by using the transmitted receipt time point and/or receipt angle of the distance measuring signal, and in addition, measure a height of the water accommodated in the container, and control the water discharge nozzle 240's operation of discharging purified water.

In one embodiment, the distance measuring sensor 300 may be a millimeter wave sensor that transmits and receives millimeter waves. Alternatively, in another embodiment, the distance measuring sensor 300 may be a microwave sensor that transmits and receives microwaves. Millimeter waves denote a signal having frequencies of bandwidths ranging from 30-300 GHz. Microwaves denote a signal including millimeter waves, and a signal having frequencies of bandwidths ranging from 1-300 GHz. Millimeter waves and microwaves exhibit transmittance through certain materials. Accordingly, millimeter waves and microwaves may pass through the covers 100, 102, 104, 106, 108 of the water purifier 1 and be emitted outward.

Figure 4:
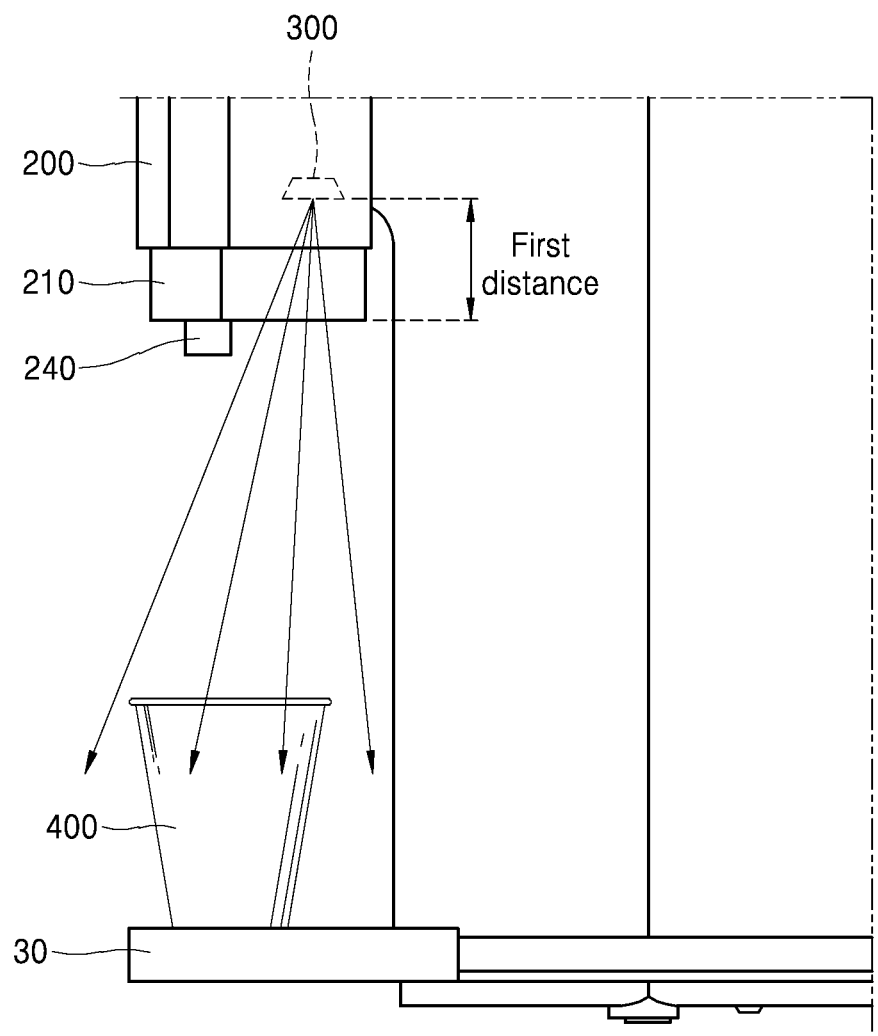
FIGS. 4 and 5 are views for describing an operation process of a water purifier in a first embodiment.
Figure 5:
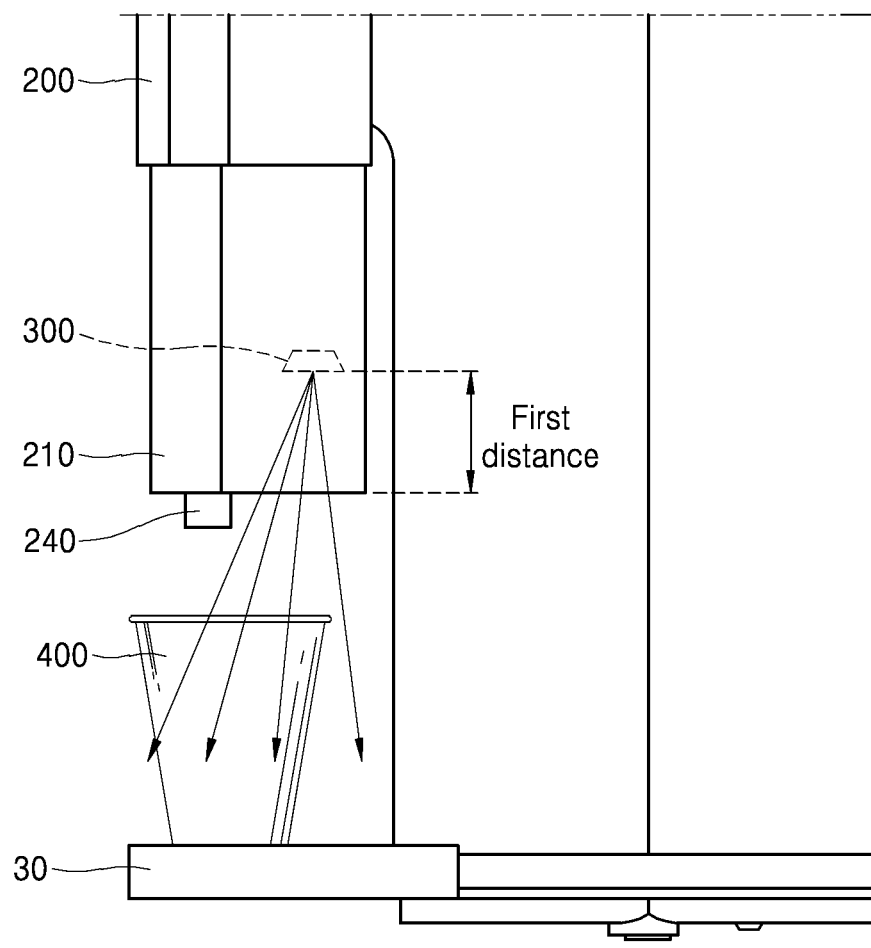

Hereafter, the water purifier 1's operation of discharging purified water is specifically described with reference to FIGS. 4 to 9. FIGS. 4 and 5 are views for describing an operation process of a water purifier 1 in a first embodiment. FIG. 4 is a view showing an initial state in which the water discharge module 20 moves downward, and FIG. 5 is a view showing a state in which the downward movement of the water discharge module 20 is completed.

Referring to FIGS. 4 and 5, in the water purifier 1 of the first embodiment, the distance measuring sensor 300 is installed in the water discharge module 20 that moves vertically. The distance measuring sensor 300 may be disposed perpendicularly with respect to a horizontal surface such as tray 30 (e.g., a peak intensity of signals emitted by the distance measuring sensor 300 may be in vertical direction), but not limited in the disclosure. The distance measuring sensor 300 may be disposed obliquely with respect to a horizontal surface (e.g., a peak intensity of signals emitted by the distance measuring sensor 300 may be oblique to a vertical direction).

In this case, a distance measuring signal, as described above, may be a millimeter wave or a microwave. Accordingly, the distance measuring sensor 300 installed in the water discharge module 20 emits a distance measuring signal, and the emitted distance measuring signal passes through the lower surface of the water discharge module 20.

The water purifier 1's operation of discharging purified water is described as follows. When a container 400 is placed on the upper surface of the tray 30, the controller controls the distance measuring sensor 300 such that the distance measuring sensor transmits a distance measuring signal, and controls the water discharge module 20 such that the water discharge module moves downward.

The transmitted distance measuring signal reflects off the inlet of the container 400 and is received by the distance measuring sensor 300, and a receipt time point of the received distance measuring signal is transmitted to the controller. The controller measures a height of the inlet of the container 400, based on the receipt time point of the distance measuring signal, as illustrated in FIG. 4.

Then, as a result of the downward movement of the water discharge module 20, a distance from the lower surface of the water discharge module 20 to the inlet of the container 400 becomes a certain distance (i.e., a first distance), as illustrated in FIG. 5. In this case, the controller stops the downward movement of the water discharge module 20. Then the controller controls the water discharge nozzle 240 such that the water discharge nozzle discharges purified water, and measures a height of the water (purified water) accommodated in the container 400 to prevent the water from overflowing the container 400.

Further, the distance measuring sensor 300 may be disposed at a first point in the water discharge module 20. In this case, the first point may be a point spaced from the lower surface of the water discharge module 20 by a first predetermined distance, as illustrated in FIGS. 4 and 5.

In one embodiment, the first distance may correspond to a distance based on a dead zone of the distance measuring sensor 300. In an example, when the distance measuring sensor 300 emits millimeter waves, a distance of the dead zone of the distance measuring sensor 300 may be 5 cm.

Specifically, the distance measuring sensor 300 has a structure in which the transmitter and the receiver are integrated with each other. In this case, a distance is not measured for a duration between a time point at which the transmitter transmits a distance measuring signal and a time point at which the receiver receives the distance measuring signal reflected. That is, there is a dead zone in the above-describe duration, in which the distance measuring sensor 300 makes no response.

If the distance measuring sensor 300 is disposed on the lower surface of the water discharge module 200, a no-response duration happens, and for the no-response duration, a height of the inlet of the container 400 and a height of the water accommodated in the container 400 cannot be measured. However, according to the disclosure, the distance measuring sensor 300 is disposed at the first point that is spaced from the lower surface of the water discharge module 20 by the first distance. Accordingly, the distance measuring sensor 300 may measure a height of the inlet of the container 400 accurately without a no-response duration.

The first point may be a point spaced a certain distance apart from the water discharge nozzle 240. Thus, a distance measuring signal may be prevented from reflecting off the water discharge nozzle 240.

In summary, in the water purifier 1 of the first embodiment, the distance measuring sensor 300 moves along with the water discharge module 20 that moves vertically, to sense a height of the inlet of the container 400 accurately. In particular, even if the rim of the inlet of the container 400 is narrow, a height of the inlet of the container 400 may be measured accurately. Additionally, purified water is discharged at a point spaced a certain distance apart from the inlet of the container 400, such that the purified water is prevented from splashing from the container 400 outward.

Further, in the water purifier 1 of one embodiment, since the water discharge module 20 discharges purified water at a point spaced a certain distance apart from the inlet of the container 400, the inlet of the container 400 does not contact the lower surface of the water discharge module. Thus, hygiene problems can be solved.

Furthermore, in the water purifier 1 of one embodiment, since the distance measuring sensor 300 is disposed at the first point inside the water discharge module 20, aesthetic qualities of the water purifier 1 may improve, and the distance measuring sensor 300 may be protected from foreign substances. In particular, because the first point is set to correspond to a distance based on a dead zone of the distance measuring sensor 300, the distance measuring sensor 300's no response duration may be removed, and operational errors in measuring a height of the inlet of the container 400 may be prevented.

Figure 6:
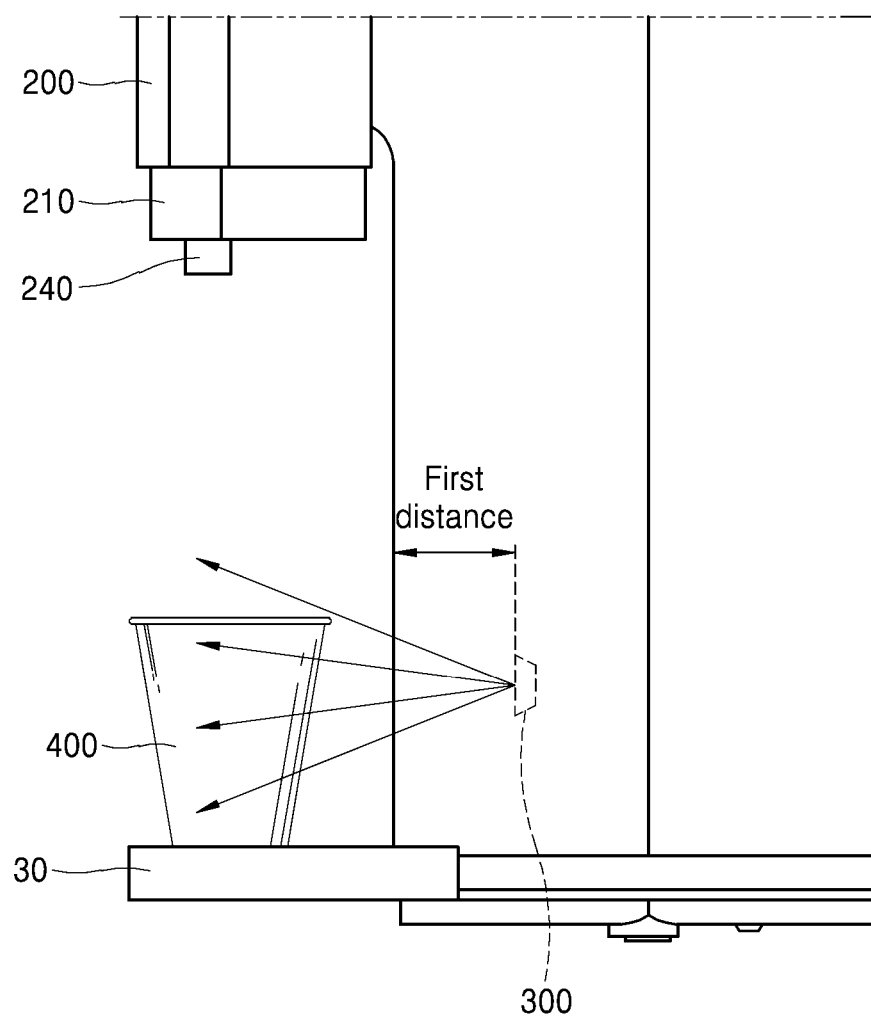
FIGS. 6 and 7 are views for describing an operation process of a water purifier in a second embodiment.
Figure 7:
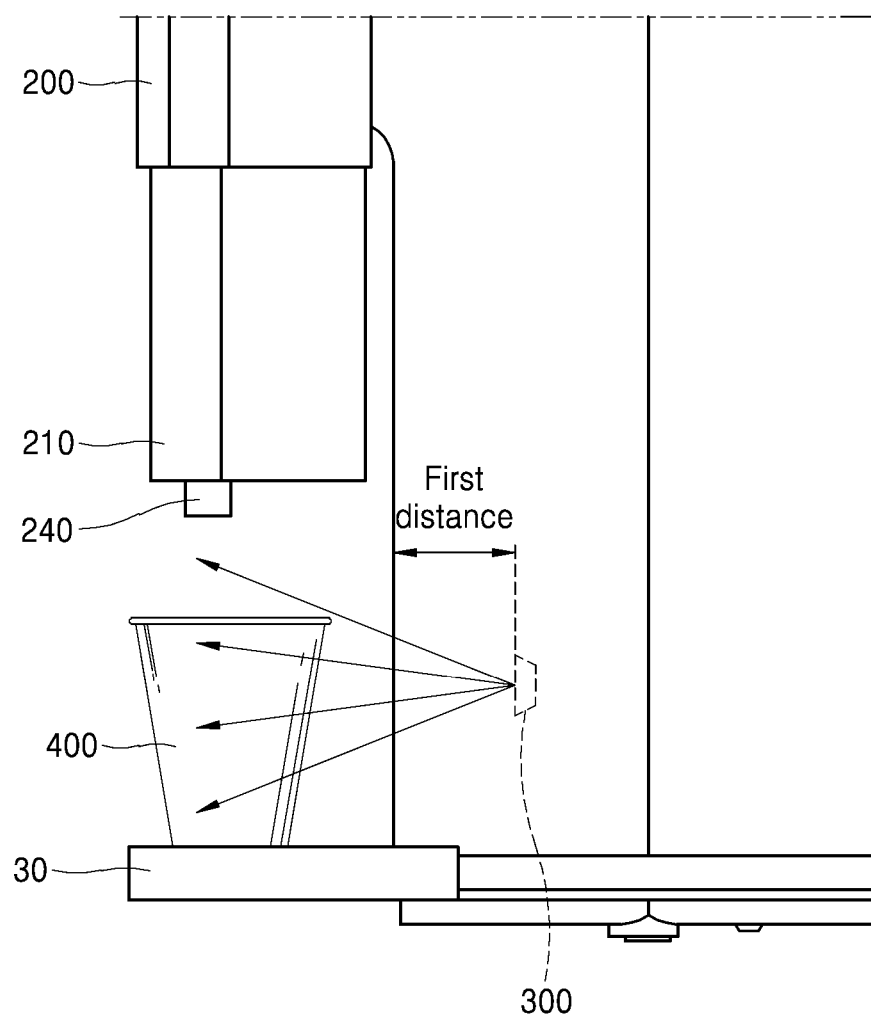

FIGS. 6 and 7 are views for describing an operation process of a water purifier 1 in a second embodiment. FIG. 6 is a view showing an initial state in which the water discharge module 20 moves downward, and FIG. 7 is a view showing a state in which the downward movement of the water discharge module 20 is completed.

Referring to FIGS. 6 and 7, in the water purifier 1 of the second embodiment, the distance measuring sensor 300 is disposed at a point in the main body 10. The distance measuring sensor 300 may be installed in parallel with a horizontal surface (e.g., a peak intensity of signals emitted by the distance measuring sensor 300 is in a horizontal direction). Additionally, the distance measuring sensor 300 may emit a distance measuring signal within a predetermined angle. For example, the angle may be 120 degrees.

In this case, the distance measuring signal, as described above, may be millimeter waves or microwaves that exhibit transmittance. Accordingly, the distance measuring sensor 300 installed in the water discharge module 20 emits a distance measuring signal, and the emitted distance measuring signal passes through the front cover 100.

The water purifier 1's operation of discharging purified water is described as follows. When a container 400 is placed on the upper surface of the tray 30, the controller controls the distance measuring sensor 300 such that the distance measuring sensor 300 transmits a distance measuring signal, and controls the water discharge module 20 such that the water discharge module 20 moves downward.

The transmitted distance measuring signal reflects off the lateral surface of the container 400 and received by the distance measuring sensor 300, and a receipt time point and a receipt angle of the received distance measuring signal are transmitted to the controller. The controller measures a height of the inlet of the container 400, based on the receipt time point and receipt angle of the distance measuring signal, as illustrated in FIG. 6.

Then, as a result of the downward movement of the water discharge module 20, a distance from the lower surface of the water discharge module 20 to the inlet of the container 400 becomes a certain distance (i.e., a first distance), as illustrated in FIG. 7. In this case, the controller stops the downward movement of the water discharge module 20. Additionally, the controller controls the water discharge nozzle 240 such that the water discharge nozzle 240 discharges purified water, and measures a height of the water (purified water) accommodated in the container 400 to prevent the water from overflowing the container 400.

The distance measuring sensor 300 may be disposed at a first point inside the main body 10. In this case, as illustrated in FIGS. 6 and 7, the first point may be a point at the front of the main body 10, i.e., a point spaced a first predetermined distance apart from the front cover 100. In one embodiment, the first distance may correspond to a distance based on a dead zone of the distance measuring sensor 300. Description in relation to this is provided above. Thus, detailed description is omitted.

The first point may be a point at which a distance measuring signal is not transmitted to the water discharge module 20. Thus, the distance measuring signal may be prevented from reflecting off the water discharge module 20 or the water discharge nozzle 240.

In summary, the water purifier 1 in the second embodiment discharges purified water at a point spaced a certain distance apart from the inlet of the container 400. Accordingly, the purified water is prevented from splashing from the container 400 outward.

Further, in the water purifier 1 of one embodiment, since the water discharge module 20 discharges purified water at a point spaced a certain distance apart from the inlet of the container 400, the inlet of the container 400 does not contact the lower surface of the water discharge module. Thus, hygiene problems can be solved.

Furthermore, in the water purifier 1 of one embodiment, since the distance measuring sensor 300 is disposed at a first point inside the main body 10, aesthetic qualities of the water purifier 1 may improve, and the distance measuring sensor 300 may be protected from foreign substances. In particular, the first point is set to correspond to a distance based on a dead zone of the distance measuring sensor 300. Thus, the distance measuring sensor 300's no response duration may be removed, and operational errors in measuring a height of the inlet of the container 400 may be prevented.

Figure 8:
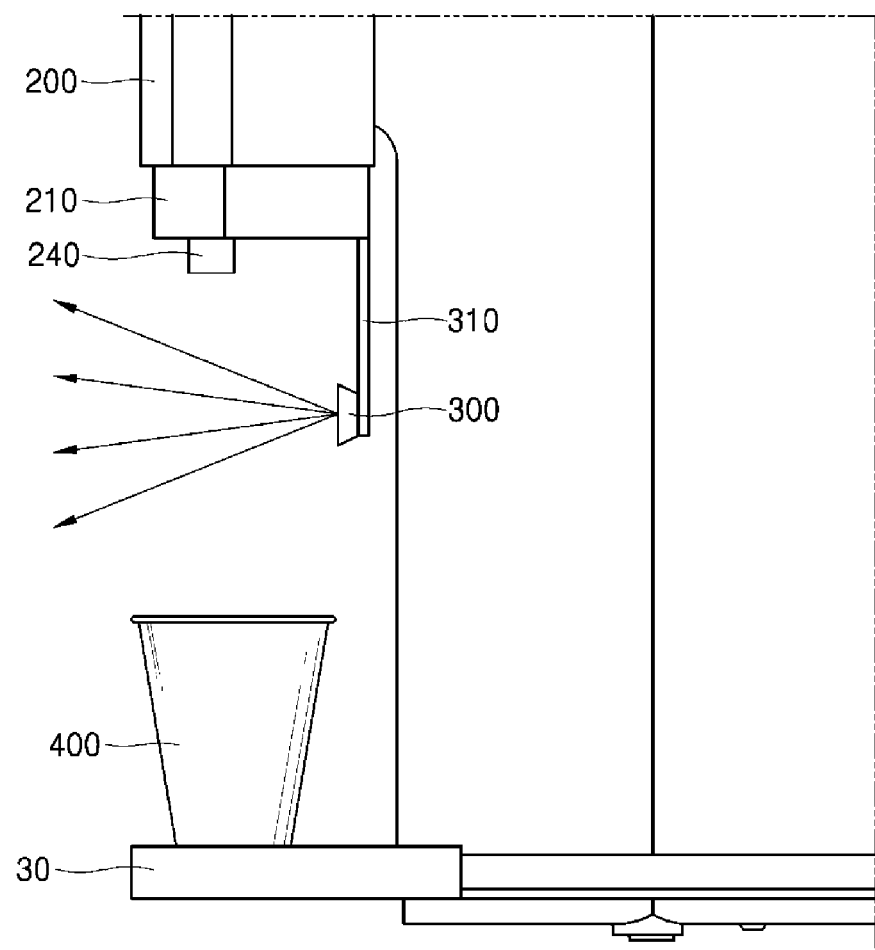
FIGS. 8 and 9 are views for describing an operation process of a water purifier in a third embodiment.
Figure 9:
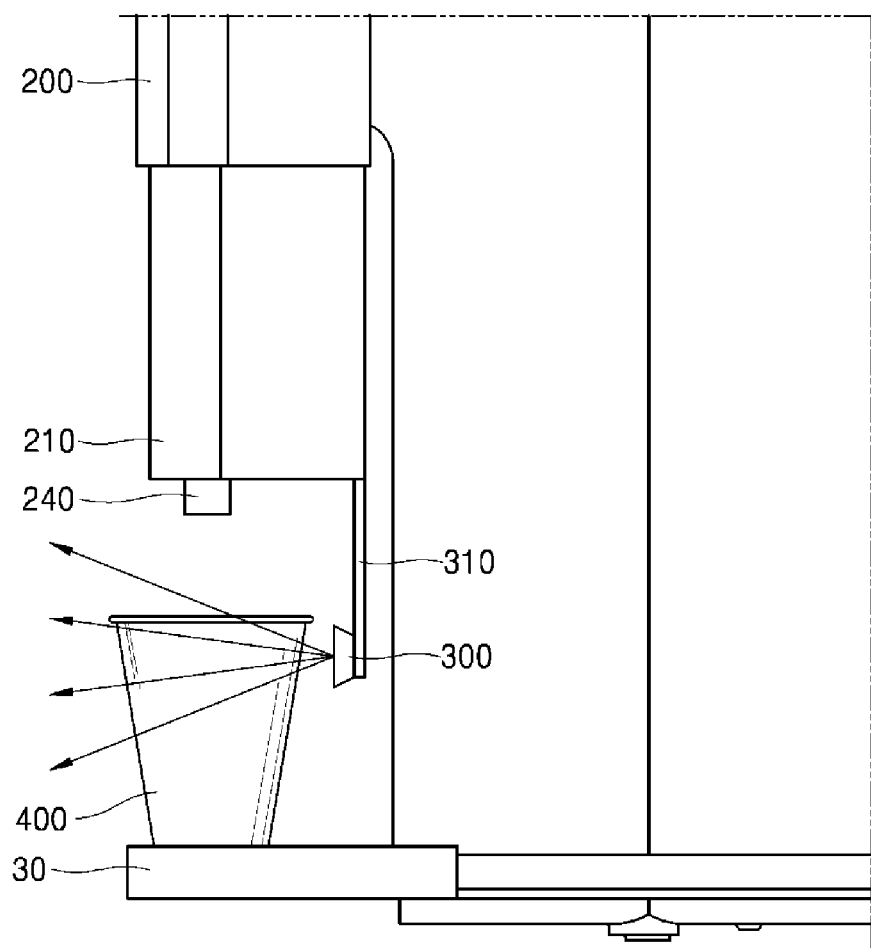

FIGS. 8 and 9 are views for describing an operation process of a water purifier 1 in a third embodiment. FIG. 8 is a view showing an initial state in which the water discharge module 20 moves downward, and FIG. 9 is a view showing a state in which the downward movement of the water discharge module 20 is completed.

Referring to FIGS. 8 and 9, in the water purifier 1 of the third embodiment, the distance measuring sensor 300 is disposed outside of the water discharge module 20.

Specifically, a connector (or connector arm) 310 is disposed on the lower surface of the water discharge module 20. The connector 310 has a shape in which the connector 310 extends in a heightwise direction of the water discharge module 20. The other end of the connector 310 is attached to the lower surface of the water discharge module 20, and the distance measuring sensor 300 may be disposed at one end of the connector 310. On end of the connector 310 may be spaced a certain distance apart from the lower surface of the water discharge module 20. When the water discharge module 20 moves vertically, the connector 310 attached to the lower surface of the water discharge module 20 also moves vertically. Accordingly, the distance measuring sensor 300 moves vertically.

The distance measuring sensor 300 may be disposed in parallel with a horizontal surface at one end of the connector 310 (e.g., a peak intensity of a signal emitted by the distance measuring sensor 300 is in a horizontal direction). The distance measuring sensor 300 may emit a distance measuring signal as a predetermined angle. For example, the angle may be 120 degrees. The distance measuring signal may be millimeter waves or microwaves that exhibit transmittance.

The water purifier 1's operation of discharging purified water is described as follows. When a container 400 is placed on the upper surface of the tray 30, the controller controls the distance measuring sensor 300 such that the distance measuring sensor transmits a distance measuring signal, and controls the water discharge nozzle such that the water discharge nozzle moves downward.

The transmitted distance measuring signal reflects off the lateral surface of the container 400 and received by the distance measuring sensor 300, and a receipt time point and a receipt angle of the received distance measuring signal are transmitted to the controller. The controller measures a height of the inlet of the container 400, based on the receipt time point and receipt angle of the distance measuring signal, as illustrated in FIG. 8.

Then, as a result of the downward movement of the water discharge module 20, a distance from the lower surface of the water discharge module 20 to the inlet of the container 400 becomes a certain distance (i.e., a first distance), as illustrated in FIG. 9. In this case, the controller stops the downward movement of the water discharge module 20. Then the controller controls the water discharge nozzle 240 such that the water discharge nozzle discharges purified water, and measures a height of the water (purified water) accommodated in the container 400 to prevent the water from overflowing the container 400.

In summary, in the water purifier 1 of the third embodiment, since the distance measuring sensor 300 moves along with the water discharge module 20 that moves vertically, a height of the inlet of the container 400 may be sensed accurately. Even if the rim of the inlet of the container 40 is narrow, a height of the inlet of the container 400 may be measured accurately. Additionally, since the water purifier 1 discharges purified water at a point spaced a certain distance apart from the inlet of the container 400, the purified water is prevented from splashing from the container 400 outward.

Further, in the water purifier 1 of one embodiment, since the water discharge module 20 discharges purified water at a point spaced a certain distance apart from the inlet of the container 400, the inlet of the container 400 does not contact the lower surface of the water discharge module. Thus, hygiene problems can be solved.

One aspect of the present disclosure is to provide a water purifier that measures a height of the inlet of a container accurately and discharges purified water into the container. Another aspect of the present disclosure is to provide a water purifier that measures a height of the inlet of a container without causing hygiene problems. Another aspect of the present disclosure is to provide a water purifier that measures a height of the inlet of a container accurately even if the rim of the inlet of the container is narrow. Yet another aspect of the present disclosure is to provide a water purifier that protects a sensor for measuring a distance from foreign substances.

Aspects according to the present disclosure are not limited to the above ones, and other aspects and advantages that are not mentioned above can be clearly understood from the following description and can be more clearly understood from the embodiments set forth herein.

In a water purifier of one embodiment, a sensor that transmits and receives a distance measuring signal is installed in a water discharge module moving vertically, or disposed at the front of a main body, to measure a height of a container accurately without a no-response duration of the sensor. In the water purifier of one embodiment, a water discharge module discharges purified water at a point spaced a certain distance apart from the inlet of a container, to prevent the inlet of the container from contacting the lower surface of the water discharge module.

A water purifier in one embodiment may include a main body including a filter for filtering raw water, a water discharge module configured to discharge the filtered raw water to a container while vertically moving at a front of the main body, and a sensor disposed at a first point inside the water discharge module, and configured to transmit a distance measuring signal to the container and to receive a reflected distance measurement signal from the container. The distance measuring signal passes through the water discharge module, and the first point is a point spaced a first predetermined distance apart from a lower surface of the water discharge module.

The first distance may correspond to a distance based on a dead zone of the sensor. The sensor may transmit and receive millimeter waves or microwaves. At the first point, the sensor may be disposed perpendicularly with respect to a horizontal surface or obliquely with respect to a horizontal surface.

The water purifier may further include a controller configured to control a movement of the water discharge module. The sensor transmits, to the controller, a receipt time point of the reflected measuring signal from the container or a water accommodated in the container. The controller controls a movement of the water discharge module and controls a water discharge operation of a water discharge nozzle disposed on the lower surface of the water discharge module, based on the receipt time point of the reflected distance measuring signal.

A water purifier in another embodiment may include a main body including a filter for filtering raw water, a water discharge module configured to discharge the filtered raw water to a container while vertically moving at a front of the main body, and a sensor disposed at a first point inside the main body, and configured to transmit a distance measuring signal to the container and to receive a reflected distance measurement signal from the container. The distance measuring signal passes through the main body to the container, and the first point is a point spaced a first predetermined distance apart from the front of the main body.

A water purifier in yet another embodiment may include a main body including a filter for filtering raw water, a water discharge module configured to discharge the filtered raw water to a container while vertically moving at a front of the main body, a connector connected to the water discharge module and configured to move vertically along with the water discharge module, a sensor disposed at an end of the connector and configured to transmit and receive a distance measuring signal, and a controller configured to determine a height of the inlet of the container, based on the distance measuring signal received from the sensor.

According to the present disclosure, purified water is discharged at a point spaced a certain distance apart from the inlet of a container, thereby preventing the purified water form splashing from the container outward. According to the present disclosure, the inlet of a container does not contact the lower surface of a water discharge module, thereby solving hygiene problems. According to the present disclosure, a sensor for measuring a distance is installed in a water purifier, thereby protecting the sensor from foreign substances.

The components and features and the like are described above with reference to the limited embodiments and accompanying drawings set forth herein for a better understanding of the subject matter in the present disclosure. However, the subject matter of the disclosure is not limited to the embodiments set forth herein. Modifications and changes can be drawn from the disclosure in various different ways by one having ordinary skill in the art. Therefore, it is to be understood that the technical spirit of the disclosure is not construed as being limited by the embodiments herein and that equivalents and equivalent modifications drawn from the scope of the appended claims are included in the scope of the technical spirit of the disclosure.

The components and features and the like are described above with reference to the limited embodiments and accompanying drawings set forth herein for a better understanding of the subject matter in the present disclosure. However, the subject matter of the disclosure is not limited to the embodiments set forth herein. Modifications and changes can be drawn from the disclosure in various different ways by one having ordinary skill in the art. Therefore, it is to be understood that the technical spirit of the disclosure is not construed as being limited by the embodiments herein and that equivalents and equivalent modifications drawn from the scope of the appended claims are included in the scope of the technical spirit of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
a main body;
a liquid discharge module including a nozzle at a lower surface thereof to discharge a liquid, and configured to move the nozzle vertically along a front of the main body; and
a sensor provided inside one of the main body or the liquid discharge module, and configured to transmit a signal to the container and to receive a reflected signal from the container,
wherein the sensor is positioned to be spaced a predetermined distance apart from a corresponding one of a front of the main body or a lower surface of the liquid discharge module, the predetermined distance being greater than or equal to a length of a dead zone of the sensor to prevent the container from being positioned within the dead zone.

2. The liquid dispenser of claim 1, wherein the sensor transmits and receives at least one of millimeter waves or microwaves.

3. The liquid dispenser of claim 2, wherein the sensor is unable to detect a distance based on the reflected signal within the dead zone for the millimeter wave or the microwave.

4. The liquid dispenser of claim 1, wherein the sensor is provided inside the liquid discharge module, and the sensor is positioned to be spaced the predetermined distance apart from a lower surface of the liquid discharge module so that the signal passes through the liquid discharge module.

5. The liquid dispenser of claim 4, wherein the sensor is provided perpendicularly with respect to a horizontal direction.

6. The liquid dispenser of claim 4, wherein the sensor is provided obliquely with respect to a horizontal direction.

7. The liquid dispenser of claim 4, wherein:
the sensor determines a receipt time point of the reflected signal from the container or liquid accommodated in the container, and
a movement of the nozzle by the liquid discharge module and a discharge of the liquid from the nozzle are determined based on the receipt time point of the signal.

8. The liquid dispenser of claim 1, further comprising a filter provided in the main body for filtering water, wherein the nozzle dispenses the filtered water received from the filter.

9. The liquid dispenser of claim 1, wherein the sensor is provided inside the main body,
wherein the signal passes through the main body to the container, and
wherein the sensor is spaced the first predetermined distance apart from the front of the main body.

10. The liquid dispenser of claim 9, wherein the sensor is positioned such that the signal is not transmitted to the liquid discharge module.

11. The liquid dispenser of claim 9, wherein the sensor is provided parallel with a horizontal direction, and emits the signal within a predetermined angle range.

12. The liquid dispenser of claim 9, wherein:
the sensor determines a receipt time point and a receipt angle of the reflected signal from the container, and
a movement of the liquid discharge module and a dispensing of the liquid from the nozzle are controlled based on the receipt time point and the receipt angle of the reflected signal.

13. The liquid dispenser of claim 1, wherein the liquid discharge module further includes a first cover that is coupled to the main body, and a second cover that includes the nozzle and is slidably coupled to the first cover to move vertically relative to main body.

14. A liquid dispenser, comprising:
a main body to provide a liquid;
a liquid discharge module including a nozzle to discharge the liquid to a container and to vertically move along a front of the main body;
a connector arm including a first end connected to the liquid discharge module so the connector arm moves vertically along with the nozzle of the liquid discharge module; and
a sensor provided at a second end of the connector arm, and configured to transmit a signal and to receive a reflection of the signal,
wherein the connector arm positions the sensor below the inlet of the container and between the main body and the container when the liquid discharge module is vertically positioned to dispense the liquid.

15. The liquid dispenser of claim 14, wherein the connector arm extends in a height-wise direction of the liquid discharge module.

16. The liquid dispenser of claim 14, wherein the sensor transmits and receives at least one of millimeter waves or microwaves.

17. The liquid dispenser of claim 14, wherein the sensor is provided parallel with a horizontal direction and emits the signal within a predetermined angle range.

18. The liquid dispenser of claim 14, wherein the second end of the connection arm is spaced a predetermined distance below a lower surface of the liquid discharge module.

19. The liquid dispenser or claim 14, wherein the height of the inlet of the container is determined based on a receipt time of the reflected signal after transmission and a receipt angle of the reflected signal.

20. The liquid dispenser of claim 14, wherein the liquid discharge module further includes a first cover that is coupled to the main body, and a second cover that includes the nozzle and is slidably coupled to the first cover to move vertically relative to main body, and wherein the first end of the connector arm is connected to the second cover of the liquid discharge module.

* * * * *